(No Model.)

J. MOSURE.
POST HOLE AUGER.

No. 467,184. Patented Jan. 19, 1892.

WITNESSES:
Albert Baker
M. J. Leonard

INVENTOR
Jonathan Mosure
BY
H. C. Hartman
ATTORNEY

THE NORRIS PETERS CO., PHOTO-LITHO., WASHINGTON, D. C.

UNITED STATES PATENT OFFICE.

JONATHAN MOSURE, OF MAGLEY, INDIANA.

POST-HOLE AUGER.

SPECIFICATION forming part of Letters Patent No. 467,184, dated January 19, 1892.

Application filed July 23, 1891. Serial No. 400,390. (No model.)

*To all whom it may concern:*

Be it known that I, JONATHAN MOSURE, a citizen of the United States, residing at Magley, in the county of Adams, in the State of Indiana, have invented certain new and useful Improvements in Post-Hole Augers; and I do hereby declare that the following is a full, clear, and exact description of the invention, which will enable others skilled in the art to which it appertains to make and use the same, reference being had to the accompanying drawings, which form part of this specification.

My invention relates to improvements in earth-augers for boring post-holes; and its objects are to provide a tool which shall do its work more rapidly and better and means whereby a small quantity of water is kept at the point of the tool for the purpose of softening the ground. I attain these objects by the devices illustrated in the accompanying drawings, in which—

Figure 1:
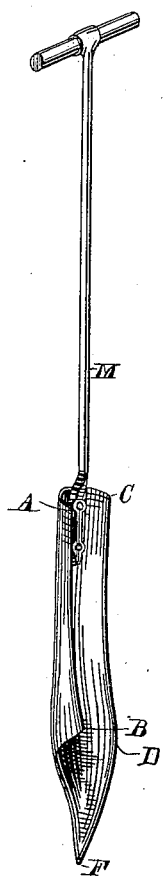
Figure 2:
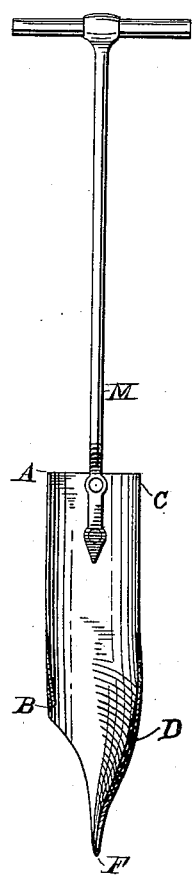
Figure 3:
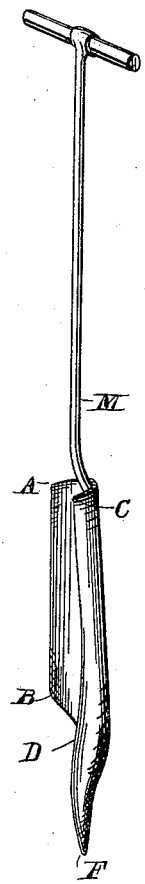
Figure 4:
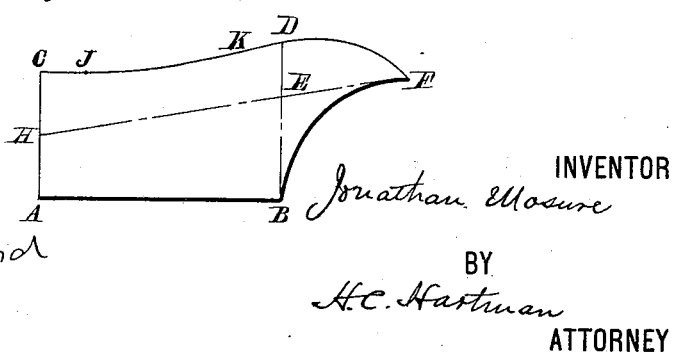

Figure 1 is a side view of my improved auger, showing the shape of the lip or boring-point. Fig. 2 is a front view of Fig. 1. Fig. 3 is a side view for clearly showing the cutting-edge of the auger. Fig. 4 is a pattern for cutting out the blade of the auger, reduced in size.

Similar letters of reference refer to similar parts throughout the several views.

To construct this auger I take, preferably, a plate of plow-steel of three-sixteenths of an inch thickness and lay out thereon a pattern, as shown in Fig. 4. For a tool calculated to bore a hole five inches in diameter the lines and curves of the pattern are preferably as follows: The line A B is twelve inches in length. The line A C is six and one-half inches long and at right angles to the line A B. The point H is placed half-way between A and C. The line B D is also at a right angle to the line A B, and the point E thereon is placed five inches from the point B. A line H E is then drawn through these points H and E and extended to F, a distance of nineteen and three-eighths inches from the point H, that being the preferable length. The line C J is four inches in length and substantially parallel with the line A B. The curved line J K is drawn with a radius of twenty-two inches and its chord is six and one-eighth inches. The curved line K D F is drawn with a radius of nine and one-half inches and its chord is nine and one-half inches. The curved line B F is drawn substantially in the form shown. The pattern thus completed is cut out of the steel plate, and the edges C J K D F, and preferably also the edge A B, are swaged down and sharpened, so as to form cutting-edges. The blade is then bent in circular form, as shown in Figs. 1, 2, and 3. The handle M is bent and attached to the blade at its upper part, so that its straight line coincides with centers of the circles upon which the blade is bent or formed, and the part F of the lip is also bent to be in line with such centers.

The essential feature of my invention consists in extending the point F straight down to the center line of the cylindrical part, instead of bending it at an angle, as is sometimes done in wood-augers. I also prefer to make the lip of greater length proportionately. The object of this and the curve formed above it is to give greater penetration, and also permit water to flow down inside the lip to the point F of the tool, whereby the water remains at the point and softens the ground in front and around it, so that it is easily penetrated. The action of the tool is so rapid that a pint of water will soften the small amount required for a depth of two and one-half to three feet before becoming entirely absorbed. I also construct the lower point of this lip D F in a convex-concave curve, the whole cutting-edge C to F forming, as it were, a sheer or wave line down to the point F, which gives a better cutting-edge. It will also be noticed that the construction of the blade gives a larger diameter at the point B than the tool has above it. This accommodates a larger amount of earth at that place, and the turn inward of the lip D, as shown in Fig. 2, tends to hold it in the body of the tool, so that it is easily lifted out, because the earth as it is worked upward in the tool is packed by being pressed upward into a smaller diameter or space, which has a tendency to hold it. The point B is bent inward, as shown in Fig. 2, and the larger part of the curve B F, commencing with the point B, is also bent inward and upward slightly, all for the purpose of assisting in removing the earth with the tool. With the exception of this bending, as just stated, a cross-section of the tool at any point will show the outside surface a curve having its center coinciding with the center line of the handle extended to the point F.

The operation is as follows: The tool substantially thus constructed is placed with point on the ground and a hole two or three inches deep is bored and the earth removed. Then I pour into this hole, the tool being replaced, a small quantity of water—say one pint—and bore the hole required in the usual manner. The water follows down to the point of the tool and softens the ground in front of and around the point, greatly reducing the difficulty of penetration.

I have bored sixty holes, each two and one-half feet in depth, in clay ground in one hour with a tool so constructed and using water, as above stated.

Having thus described my invention, what I claim as new is—

1. A post-hole-auger blade formed of a plate of metal bent or curved into a form approximately cylindrical, but having the lower portion bent upon a circle of somewhat larger diameter than the upper part, said blade having the cutting-edge cut or formed in a compound curve, giving a sheer thereto, and having a lip extending downward with its point in line with the center line of the circles upon which the tool is bent or curved.

2. A post-hole-auger blade formed of a curved or bent plate of metal, the cutting-edge of which extends to and terminates in a boring-point and the other edge of which is formed with the point B and the curve B F, said point and the upper part of said curve being bent slightly inward to support the load.

In testimony whereof I hereunto subscribe my name, in the presence of two witnesses, this 23d day of June, 1891.

JONATHAN MOSURE.

Witnesses:
H. C. HARTMAN,
ALBERT BAKER.